US012173206B2

(12) United States Patent
Takamori

(10) Patent No.: US 12,173,206 B2
(45) Date of Patent: Dec. 24, 2024

(54) ALKALI-DISPERSIBLE HOT MELT PRESSURE-SENSITIVE ADHESIVE

(71) Applicant: Henkel AG & Co., KGaA, Dusseldorf (DE)

(72) Inventor: Ai Takamori, Osaka (JP)

(73) Assignee: Henkel AG & CO. KGaA, Duesseldorf (DE)

(*) Notice: Subject to any disclaimer, the term of this patent is extended or adjusted under 35 U.S.C. 154(b) by 0 days.

(21) Appl. No.: 17/806,313

(22) Filed: Jun. 10, 2022

(65) Prior Publication Data
US 2022/0372343 A1    Nov. 24, 2022

Related U.S. Application Data

(63) Continuation of application No. PCT/JP2020/046222, filed on Dec. 11, 2020.

(51) Int. Cl.
| | | |
|---|---|---|
| C09J 7/38 | (2018.01) | |
| B32B 7/12 | (2006.01) | |
| C09J 153/02 | (2006.01) | |
| B32B 15/04 | (2006.01) | |
| B32B 17/06 | (2006.01) | |
| B32B 27/28 | (2006.01) | |
| B32B 27/32 | (2006.01) | |
| B32B 27/36 | (2006.01) | |
| B32B 29/00 | (2006.01) | |
| C09J 7/35 | (2018.01) | |

(52) U.S. Cl.
CPC ............ *C09J 7/387* (2018.01); *B32B 7/12* (2013.01); *C09J 153/02* (2013.01); *B32B 15/04* (2013.01); *B32B 17/06* (2013.01); *B32B 27/28* (2013.01); *B32B 27/32* (2013.01); *B32B 27/36* (2013.01); *B32B 29/002* (2013.01); *B32B 2519/00* (2013.01); *C09J 7/35* (2018.01); *C09J 2203/334* (2013.01); *C09J 2301/408* (2020.08)

(58) Field of Classification Search
CPC ............ C09J 7/387; C09J 7/35; C09J 153/02
See application file for complete search history.

(56) References Cited

U.S. PATENT DOCUMENTS

| 9,988,528 B2 | 6/2018 | Fouquay et al. |
| 10,138,400 B2 | 11/2018 | Inoue et al. |
| 2020/0071575 A1 | 3/2020 | Bruneau et al. |

FOREIGN PATENT DOCUMENTS

| JP | 2010531908 A | 9/2010 |
| JP | 2013194108 A | 9/2013 |
| JP | 5671846 B2 | 2/2015 |
| JP | 2016060847 A | 4/2016 |
| JP | 6223203 B2 | 11/2017 |
| JP | 2019070131 A | 5/2019 |
| WO | 2014157220 A1 | 10/2014 |
| WO | 2018115789 | 6/2018 |

*Primary Examiner* — Ling Siu Choi
*Assistant Examiner* — David L Miller
(74) *Attorney, Agent, or Firm* — Sun Hee Lehmann

(57) ABSTRACT

The object of the present invention is to provide an alkali-dispersible hot melt pressure-sensitive adhesive which (i) has a high alkali-dispersibility, (ii) is excellent in strength to retain the label, (iii) hardly causes an adhesive residue problem and (iv) is capable of reducing stringing. The present invention relates to an alkali-dispersible hot melt pressure-sensitive adhesive comprising: (A) a thermoplastic block copolymer which is a copolymer of a vinyl-based aromatic hydrocarbon and a conjugated diene compound, (B) a tackifier resin and (C) at least one selected from the group consisting of a fatty acid and a derivative thereof, wherein the thermoplastic block copolymer (A) comprises (A1) a styrene-based block copolymer having a styrene content of less than 40 mass % and the tackifier resin (B) comprises an α-methylstyrene-based resin.

4 Claims, No Drawings

ALKALI-DISPERSIBLE HOT MELT PRESSURE-SENSITIVE ADHESIVE

TECHNICAL FIELD

The present invention relates to an alkali-dispersible hot melt pressure-sensitive adhesive suitable as a pressure-sensitive adhesive for label of glass bottles, PET (polyethylene terephthalate) bottles, or the like, and particularly relates to an alkali-dispersible hot melt pressure-sensitive adhesive effectively used for bonding a PET bottle for a carbonated beverage and a label.

BACKGROUND ART

Generally, as a container for a medicine and a beverage, an aluminum can, a glass bottle, and a polyethylene terephthalate (PET) bottle are widely used. A Label is attached to the surface of these containers with a pressure-sensitive adhesive with such a strength that the label is not able to be peeled by hand. As the label for a beverage container, a polyethylene terephthalate (PET) film, a biaxially oriented polypropylene films (OPP), and a polylactic acid (PLA) film are much used as a body-wrapping (wrap-around) label (a roll label).

When a container to which a label is attached is reused, it is necessary to collect the used container at the factory, immerse the container in a heated alkaline aqueous solution, and separate the label from the container. Therefore, the pressure-sensitive adhesive applied to the label for a container is required to have the property of swelling, softening, dispersing, or dissolving in an aqueous alkaline solution (alkali dispersibility), whereby the label can be peeled from the container in a short time.

Patent Documents 1 to 3 disclose an alkali-dispersible hot melt pressure-sensitive adhesive comprising a styrene-based block copolymer, a tackifier resin, and an oil and fat. The hot melt pressure-sensitive adhesives in these documents comprise modified rosins as the tackifier resin, and a coconut oil, a rice oil, a sunflower oil, a rapeseed oil and the like as the fat and oil.

The alkali-dispersible hot melt pressure-sensitive adhesive is required to be excellent in adhesiveness (holding strength) between the label and the container in addition to be excellent in "alkali-dispersibility". Particularly, in the field of beverages, it is required not only to have "alkali-dispersibility" and "holding strength" but to leave no adhesive residue on the container after the label is peeled from the container, that is, to have excellent releasability.

In a beverage manufacturer, when a carbonated beverage is produced, there is a step of filling the carbonated beverage into a PET bottle having an attached label. When the carbonated beverage is filled and then the PET bottle is left to stand, carbon dioxide may cause the PET bottle to expand slightly, causing the problem that the label is lifted or peeled from the bottle in some cases. However, the hot melt pressure-sensitive adhesives described in Patent Documents 1 to 3 are insufficient to solve the problems of label-lifting and label-peeling. In the beverage industry, an alkali-dispersible hot melt pressure-sensitive adhesive having particularly excellent holding strength is desired.

The alkali-dispersible hot melt pressure-sensitive adhesive is also required to reduce stringing during being applied. When the hot melt pressure-sensitive adhesive is applied, a dedicated coating device such as a hot melt applicator or a labeler is usually used. The hot melt pressure-sensitive adhesive is heated to about 120 to 190° C. and applied from the head of the dedicated coating device to the label as an adherend. When the hot melt pressure-sensitive adhesive is applied to the label, a thread-like substance (stringing) of the hot melt pressure-sensitive adhesive may be generated between the tip of the head and the label in some cases. In addition, a stringing may be sometimes generated between the application-completed label and the application-uncompleted label. This thread-like substance is due to the stringiness of the hot melt pressure-sensitive adhesive and stains the head or the label. Therefore, the development of hot melt pressure-sensitive adhesives with less stringing is an important responsibility for adhesive manufacturers.

The demand for reducing stringing of the hot melt pressure-sensitive adhesives has been increasing recently. However, the hot melt pressure-sensitive adhesives described in Patent Documents 1 to 3 do not completely satisfy the requirement for reducing stringing.

Therefore, it is desired to develop an alkali-dispersible hot melt pressure-sensitive adhesive being excellent in all properties of alkali-dispersibility, holding strength, reduction of adhesive residue, and reduction of stringing.

CITATION LIST

Patent Document

Patent Document 1: Japanese Patent Publication No. 5671846

Patent Document 2: Japanese Patent Publication No. 6223203

Patent Document 3: Japanese Patent Laid-Open Publication No. 2016-60847

SUMMARY OF INVENTION

Technical Problem

The object of the present invention is to provide an alkali-dispersible hot melt pressure-sensitive adhesive which (i) has a high alkali-dispersibility, (ii) is excellent in holding strength to retain a label, (iii) hardly causes an adhesive residue problem and (iv) is capable of reducing stringing.

Solution to Problem

The present invention and preferred embodiments of the present invention are as follows:

1. An alkali-dispersible hot melt pressure-sensitive adhesive comprising:
   A. a thermoplastic block copolymer which is a copolymer of a vinyl-based aromatic hydrocarbon and a conjugated diene compound,
   B. a tackifier resin and
   C. at least one selected from the group consisting of a fatty acid and a derivative thereof,
      wherein the thermoplastic block copolymer (A) comprises (A1) a styrene-based block copolymer having a styrene content of less than 40 mass % and the tackifier resin (B) comprises an α-methylstyrene-based resin.
2. The alkali-dispersible hot melt pressure-sensitive adhesive according to the above item 1, a content of the α-methylstyrene-based resin is 1 to 20 parts by mass based on 100 parts by mass of the total mass of the components (A) to (C).

3. The alkali-dispersible hot melt pressure-sensitive adhesive according to the above item 1 or 2, further comprising a Fischer-Tropsch wax.

4. A label on which the alkali-dispersible hot melt pressure-sensitive adhesive according to any one of the above items 1 to 3 is applied.

5. A container to which the label according to the above item 4 is attached.

Advantageous Effect of Invention

The alkali-dispersible hot melt pressure-sensitive adhesive of the present invention can be used for adhering a label to a container such as a PET bottle or a glass bottle, and is excellent in strength to retain a label. For example, when a label is attached to a container such as a PET bottle filled with a carbonated beverage with the alkali-dispersible hot melt pressure-sensitive adhesive of the present invention, the displacement and lifting of the label hardly occurs even if the container expands.

The alkali-dispersible hot melt pressure-sensitive adhesive of the present invention has high alkali-dispersibility, and when the container with the label attached thereto is immersed in an alkaline aqueous solution, the label can be peeled off cleanly without adhesive residue. Further, the alkali-dispersible hot melt pressure-sensitive adhesive of the present invention can be removed by hand force or the like, and adhesive residue hardly remains when the label is removed. Therefore, the alkali-dispersible hot melt pressure-sensitive adhesive of the present invention is suitably used for a container or the like for recycling.

The alkali-dispersible hot melt pressure-sensitive adhesive of the present invention is applied to a label or the like by using a dedicated coater or the like, and the generation of stringing can be suppressed when the adhesive is applied.

DESCRIPTION OF EMBODIMENTS

The alkali-dispersible hot melt pressure-sensitive adhesive according to the present invention comprises (A) a thermoplastic block copolymer which is a copolymer of a vinyl-based aromatic hydrocarbon and a conjugated diene compound, (B) a tackifier resin, and (C) at least one selected from the group consisting of a fatty acid and a derivative thereof. In this specification, it may be described as "component (A)", "component (B)" and "component (C)", respectively, and the alkali-dispersible hot melt pressure-sensitive adhesive of the present invention may be simply as the "hot melt pressure-sensitive adhesive".

The label-holding property is an opposing characteristic to the label-releasability and alkali-dispersibility. The hot melt pressure-sensitive adhesive of the present invention comprises the component (A), the component (B) and the component (C) described below, and the component (A) comprises (A1) a styrene-based block copolymer having a styrene content of less than 40 mass % and the component (B) comprises an α-methylstyrene-based resin, and thereby both of the above opposing characteristics can be improved and also the stringing can be reduced when it is applied to the adherend.

<(A) Thermoplastic Block Copolymer>

In the present invention, "(A) thermoplastic block copolymer" is a copolymer in which a vinyl-based aromatic hydrocarbon and a conjugated diene compound undergo block copolymerization, and is commonly a resin composition having a vinyl-based aromatic hydrocarbon block and a conjugated diene compound block.

The "vinyl-based aromatic hydrocarbon" means an aromatic hydrocarbon compound having a vinyl group. Specific examples thereof include styrene, o-methylstyrene, p-methylstyrene, p-tert-butylstyrene, 1,3-dimethylstyrene, α-methylstyrene, vinylnaphthalene and vinylanthracene. Particularly, styrene is preferred. These vinyl-based aromatic hydrocarbons may be used alone or in combination.

The "conjugated diene compound" means a diolefin compound having at least a pair of conjugated double bonds. Specific examples of the "conjugated diene compound" may include 1,3-butadiene, 2-methyl-1,3-butadiene (or isoprene), 2,3-dimethyl-1,3-butadiene, 1,3-pentadiene and 1,3-hexadiene. 1,3-butadiene and 2-methyl-1,3-butadiene are particularly preferred. These conjugated diene compounds may be used alone or in combination.

The thermoplastic block copolymer (A) used in the present invention may be either a non-hydrogenated or hydrogenated thermoplastic block copolymer.

Specific examples of the "non-hydrogenated thermoplastic block copolymer (A)" may include block copolymers in which block(s) based on the conjugated diene compound are not hydrogenated. Specific examples of the "hydrogenated thermoplastic block copolymer (A)" include block copolymers in which all or a part of the blocks based on the conjugated diene compound are hydrogenated.

A proportion that the "hydrogenated thermoplastic block copolymer (A)" is hydrogenated may be indicated by a "hydrogenation ratio". The "hydrogenation ratio" of the "hydrogenated thermoplastic block copolymer (A)" refers to a proportion of double bonds converted into saturated hydrocarbon bonds by hydrogenation on the basis of all aliphatic double bonds included in the blocks based on the conjugated diene compound. The "hydrogenation ratio" can be measured by an infrared spectrophotometer, a nuclear magnetic resonance device and the like.

As one aspect of the present invention, it is preferable that the thermoplastic block copolymer (A) is a styrene-based block copolymer. The styrene-based block copolymer means a polymer having at least one styrene block. The styrene block means a segment comprising styrene as a main monomer, and it is preferred that the segment is substantially composed of styrene only.

Specific examples of the "non-hydrogenated thermoplastic block copolymer (A)" include a styrene-isoprene-styrene block copolymer (also referred to as "SIS") and a styrene-butadiene-styrene block copolymer (also referred to as "SBS"). Specific examples of the "hydrogenated thermoplastic block copolymer (A)" include a hydrogenated styrene-isoprene-styrene block copolymer (also referred to as "SEPS"), a hydrogenated styrene-butadiene-styrene block copolymer (also referred to as "SEBS"), and styrene-butylene/butadiene-styrene block copolymer (also referred to as "SBBS").

In the present invention, the weight average molecular weight (Mw) of the compound included as the component (A) is not particularly limited, but is preferably $1.0 \times 10^4$ to $3.0 \times 10^5$, more preferably $5.0 \times 10^4$ to $2.0 \times 10^5$.

In the present specification, the weight average molecular weight is measured by gel permeation chromatography (GPC) using a calibration curve using monodisperse molecular weight polystyrene as a standard substance to convert molecular weight.

In the present invention, the thermoplastic block copolymer (A) (component (A)) comprises (A1) a styrene-based block copolymer having a styrene content of less than 40% by mass (also described as "component (A1)"). "Styrene content" refers to the proportion of styrene included in the thermoplastic block copolymer. The styrene content of the component (A1) is less than 40% by mass, preferably less than 35% by mass, and more preferably 15% by mass or more and less than 35% by mass.

When the hot melt pressure-sensitive adhesive of the present invention comprises the component (A1) having a styrene content within the above range, the label can be stably retained to a container such as a PET bottle, and the label is less likely to be lifted, displaced or the like.

In the hot melt pressure-sensitive adhesive of the present invention, the content of the component (A1) is preferably 70 parts by mass or more, more preferably 80 parts by mass or more, and may be 100 parts by mass, based on 100 parts by mass of the total amount of the component (A). When the content of the component (A1) in the hot melt pressure-sensitive adhesive of the present invention is within the above range, the holding strength is further improved.

The thermoplastic block copolymer (A) may be used alone or in combination of two or more. As one embodiment, (A1) a styrene-based block copolymer having a styrene content of less than 40% by mass and a styrene-based block copolymer that does not fall under the component (A1) may be blended together. The styrene-based block copolymer that does not fall under the component (A1) means the styrene-based block copolymer having a styrene content of 40% by mass or more (hereinafter, also described as "(A2) styrene-based block copolymer having a styrene content of 40% by mass or more" or "component (A2)").

In the present invention, a commercially available product may be used as the (A1) styrene-based block copolymer having a styrene content of less than 40% by mass. Examples thereof include:

Tufprene T420 (trade name), Tuftec P3000 (trade name), Tuftec H1053 (trade name) manufactured by Asahi Kasei Chemicals Corporation;

Quintac3460 (trade name), Quintac3433N (trade name), Quintac3520 (trade name), Quintac3270 (trade name) manufactured by ZEON Corporation;

D1160 (trade name), Kraton G1650 (trade name), Kraton G1652 (trade name), and Kraton G1657 (trade name) manufactured by Kraton Corporation.

The component (A) is preferably a triblock-type styrene block copolymer having a diblock content of 0% by mass. Particularly, when the triblock type styrene block copolymer having a diblock content of 0% by mass is used as the component (A1), the holding strength of the hot melt pressure-sensitive adhesive becomes more excellent.

In the present specification, the "diblock" means a block copolymer having two blocks, and usually means a block copolymer having one "vinyl-based aromatic hydrocarbon block" (preferably one "styrene block") and one "conjugated diene compound block (which may be hydrogenated)", and for example, it may be represented by the following formula (1).

$$S\text{-}E \quad (1)$$

(In formula (1), S is a styrene block and E is a conjugated diene compound block.)

In the present specification, the "diblock content" of the component (A) means the proportion of the diblock copolymer (preferably a block copolymer represented by the formula (1), which has one styrene block and one conjugated diene compound block) contained in the thermoplastic copolymer of the component (A).

The triblock-type styrene-based block copolymer is, for example, preferably a styrene-based block copolymer having a structure represented by the following formula (2) and having no other blocks.

$$S\text{-}E\text{-}S \quad (2)$$

(In formula (2), S is a styrene block and E is a conjugated diene compound block.)

In the present specification, the triblock-type styrene-based block copolymer has a diblock content of 0% by mass, and is distinguished from the diblock-type styrene-based block copolymer.

In the present invention, it is most desirable that the component (A1) is a styrene-ethylene/butylene-styrene (SEBS) triblock copolymer. When the hot melt pressure-sensitive adhesive of the present invention comprises a styrene-ethylene/butylene-styrene (SEBS) triblock copolymer, the cohesive force is significantly improved. As a result, when the label is adhered to the container using the hot melt pressure-sensitive adhesive, the label can be kept adhered for a long time without being lifted from the container and without being displaced.

Examples of the commercially available product of a styrene-based block copolymer (A2) having a styrene content of 40% by mass or more include:

Asaprene T439 (trade name), Tufprene 125 (trade name), Tufprene A (trade name), Tuftec P2000 (trade name), Tuftec H1043 (trade name) and Tuftec H1051 (trade name) manufactured by Asahi Kasei Chemicals Co., Ltd.;

TR2000 (trade name) and TR2250 (trade name) manufactured by JSR Corporation; and SOIT6414 (trade name) manufactured by Enichem. These commercially available products can be used alone or in combination.

<(B) Tackifier Resin>

The hot melt pressure-sensitive adhesive of the present invention can improve the strength to hold the label on the container by comprising (B) a tackifier resin (component (B)). The "tackifier resin" may be the one that usually used for a hot melt pressure-sensitive adhesive, and is not particularly limited as long as the hot melt pressure-sensitive adhesive targeted by the present invention can be obtained. In the present specification, the component (B) does not include the compound described as the above component (A).

In the present invention, the tackifier resin(B) comprises an α-methylstyrene-based resin. The cohesiveness of the hot melt pressure-sensitive adhesive is enhanced and the releasability and holding strength thereof are improved by comprising the α-methylstyrene-based resin. As the α-methylstyrene-based resin, for example, an α-methylstyrene homopolymer or a styrene/α-methylstyrene copolymer may be used.

As one embodiment of the present invention, the α-methylstyrene-based-resin is preferably a styrene/α-methylstyrene copolymer. The α-methylstyrene-based resin has preferably a softening point (measured by the ring and ball method specified in JIS K2207) of 65° C. to 160° C., and more preferably a softening point of 85 to 160° C. Specifically, examples of commercially available products include Kristalex 3085 (trade name), Kristalex 3100 (trade name), Kristalex 1120 (trade name), Kristalex 5140 (trade name), Endix 155 and Plastrin 290 manufactured by Eastman Chemical Company, FTR-2120 (trade name) manufactured by Mitsui Chemical Company and the like.

In the hot melt adhesive of the present invention, the content of the α-methylstyrene-based resin based on 100 parts by mass of the total mass of the tackifier resin (B) is not particularly limited, but is preferably 1 part by mass or more, more preferably 2 parts by mass or more, further preferably 4 parts by mass or more, and preferably 30 parts by mass or less, more preferably 20 parts by mass or less, further preferably 15 parts by mass or less.

The tackifier resin (B) may comprise other tackifier resin in addition to the α-methylstyrene-based resin. Examples of other tackifier resin may include natural rosins, modified rosins, hydrogenated rosins, glycerol esters of natural rosins, glycerol esters of modified rosins, pentaerythritol esters of natural rosins, pentaerythritol esters of modified rosins, pentaerythritol esters of hydrogenated rosins, copolymers of natural terpenes, three-dimensional polymers of natural terpenes, hydrogenated derivatives of copolymers of hydrogenated terpenes, polyterpene resins, hydrogenated derivatives of phenol-based modified terpene resins, aliphatic petroleum hydrocarbon resins, hydrogenated derivatives of aliphatic petroleum hydrocarbon resins, aromatic petroleum hydrocarbon resins, hydrogenated derivatives of aromatic petroleum hydrocarbon resins, cyclic aliphatic petroleum hydrocarbon resins and hydrogenated derivatives of cyclic aliphatic petroleum hydrocarbon resins.

The component (B) preferably comprises a tackifier resin having an acid value of 0 to 300 mgKOH/g, more preferably a rosin-based tackifier resin having an acid value of 50 to 300 mgKOH/g, further preferably a rosin-based tackifier resin having an acid value of 150 to 300 mgKOH/g, and still more preferably a rosin-based tackifier resin having an acid value of 150 to 250 mgKOH/g. The acid value within this range improves the alkali-dispersibility of the hot melt pressure-sensitive adhesive of the present invention.

In one embodiment of the present invention, the hot melt pressure-sensitive adhesive comprises, as the component (B), when both of the α-methylstyrene-based resin and the tackifier resin having an acid value of 0 to 300 mgKOH/g (preferably a rosin-based tackifier resin having an acid value of 0 to 300 mgKOH/g), the hot melt pressure-sensitive adhesive of the present invention is excellent in alkali dispersibility, label-holding strength, and label-releasability.

These tackifier resins may be used alone or in combination. For the tackifier resin, liquid type tackifier resins may also be used as long as they are colorless to pale yellow in color tone, have substantially no odor, and have good thermal stability.

<(C) Fatty Acid and Derivatives Thereof>

The hot melt pressure-sensitive adhesive of the present invention comprises (C) at least one selected from the group consisting of a fatty acid and a derivative thereof (component (C)). When the hot melt pressure-sensitive adhesive comprises the component (C), the hot melt pressure-sensitive adhesive of the present invention is excellent in alkali-dispersibility. The component (C) may comprises one kind of compound alone, or may comprise two or more kinds.

Herein, the fatty acid refers to an aliphatic carboxylic acid having at least one carboxy group, and may have a hydroxy group. Fatty acids are broadly divided into saturated fatty acids and unsaturated fatty acids. The saturated fatty acid is an acid having no double bond or no triple bond in a carbon chain. The unsaturated fatty acid is an acid having a double bond or a triple bond in a carbon chain.

Any saturated fatty acid may be used as long as it does not adversely affect the hot melt pressure-sensitive adhesive of the present invention, and it has preferably 1 to 30 carbon atoms, more preferably 3 to 26 carbon atoms, still more preferably 8 to 24 carbon atoms, and further preferably 12 to 22 carbon atoms, and still more further preferably 14 to 22 carbon atoms. The saturated fatty acid may be open-chain or cyclic, and preferably open-chain. The open-chain saturated fatty acid may have a straight chain or a branched chain, and is preferably a straight-chain saturated fatty acid. Specific examples of the saturated fatty acid include formic acid, acetic acid, propionic acid, butyric acid, valeric acid, caproic acid, lauric acid, tridecyl acid, myristic acid, palmitic acid, stearic acid, tricosyl acid, and 12-hydroxy stearic acid, and the like.

Any unsaturated fatty acid may be used as long as it does not adversely affect the hot melt pressure-sensitive adhesive of the present invention, and it has preferably 3 to 26 carbon atoms, more preferably 4 to 22 carbon atoms, and still more preferably 14 to 22 carbon atoms.

The number of carbon-carbon unsaturated bonds of the unsaturated fatty acid is preferably 1 to 6, more preferably 1 to 3, and most preferably 1 to 2.

Examples of the unsaturated fatty acid include crotonic acid, oleic acid, linolenic acid, docosahexaenoic acid, linoleic acid, and ricinoleic acid.

In the present specification, the derivative of the fatty acid (fatty acid derivative) means a compound obtained by the substitution or other chemical reaction of the fatty acids. Examples of the fatty acid derivative include a fat and oil, hardened oil, fatty acid amide, a fatty acid alkyl ester, a monoglyceride, a diglyceride, a sorbitan fatty acid ester, a diglycerin fatty acid ester and the like, and a fat and oil and a hardened oil are preferable, and a hardened oil is more preferable. A "fat and oil" contains triglyceride (triacylglycerol), which is an ester of a fatty acid and glycerin, as a main component.

The hot melt pressure-sensitive adhesive of the present invention may comprise a fat and oil generally used as an edible or industry fat and oil. The fat and oil may be in liquid form or in solid form at a normal temperature (about 20 to 26° C.), and preferably in liquid form at a normal temperature, and a vegetable oil is preferred. Examples of the fat and oil include corn oil, soybean oil, epoxidized soybean oil, sesame oil, linseed oil, olive oil, lettuce oil, fish oil, butter, lard, castor oil, rapeseed oil, sunflower oil, rice oil, and cottonseed oil. One kind may be used alone, or two or more kinds may be used in combination.

The "hardened oil" is obtained by subjecting a fat and oil which is in liquid form at a normal temperature to hydrogenation and increasing the ratio of saturated fatty acid having a higher melting point to solidify the fat and oil at a normal temperature. Any "hardened oil" may be used as long as it does not adversely affect the hot melt pressure-sensitive adhesive of the present invention. Specific examples of the hardened oil include a castor oil subjected to hydrogenation (that is, hydrogenated castor oil), a hydrogenated soybean oil, and a hydrogenated salad oil.

As one embodiment of the present invention, the hot melt pressure-sensitive adhesive preferably comprises, as the fatty acid or a derivative thereof (C), (C1) a fatty acid derivative having a melting point of 40° C. or more (also referred to as "component (C1)" or "fatty acid derivative (C1)"). The melting point of the fatty acid derivative (C1) is preferably 45 to 120° C., more preferably 50 to 100° C., and further preferably 50 to 90° C. The component (C1) may comprise one kind alone or two or more kinds.

When the melting point of the fatty acid derivative (C1) is in the above range, the hot melt pressure-sensitive adhesive of the present invention is suitable as a hot melt pressure-sensitive adhesive for labels due to improved holding strength. When a PET bottle for a carbonated beverage and a label are attached to each other via the hot melt pressure-sensitive adhesive of the present invention, the label is retained on the PET bottle for a long period of time without being displaced or lifted even if the PET bottle expands with carbon dioxide gas.

Herein, the melting point refers to a value measured using differential scanning calorimetry (DSC). Specifically, 10 mg of a sample is weighed in an aluminum container, measurement is carried out at a temperature increasing rate of 5° C./min using DSC6220 (trade name) manufactured by Nano Technology Inc., and the temperature at the top of the melting peak is referred to as the melting point.

The content of the component (C1) based on 100 parts by mass of the total amount of the component (C) is preferably 40 parts by mass or more, more preferably 50 parts by mass or more, further preferably 60 parts by mass or more, and may be 100 parts by mass. In one embodiment of the present invention, in addition to the component (C1), the component (C) may comprise (C2) a fatty acid derivative having a melting point of less than 40° C. (preferably a fat and oil having a melting point of less than 40° C.).

In the present invention, it is preferable to comprise a hardened oil as the (C1) fatty acid derivative. The melting point of the hardened oil as the component (C1) is 40° C. or more, preferably 50 to 100° C., more preferably 50 to 90° C. When the hot melt pressure-sensitive adhesive of the present invention comprises the hardened oil having a melting point of 40° C. or more, it is maintained in a solid state without melting even at a high temperature and improves the cohesive force with the adherend such as a label, resulting in having high holding strength.

Examples of the hardened oil include a castor oil subjected to hydrogenation (that is, hydrogenated castor oil), a hydrogenated soybean oil, a hydrogenated salad oil, a hydrogenated rapeseed oil, a hydrogenated palm oil, a hydrogenated beef tallow oil and the like. Particularly a hydrogenated castor oil, a hydrogenated soybean oil and a hydrogenated rapeseed oil are preferable, and hydrogenated castor oil is most preferable.

When the hot-melt pressure-sensitive adhesive of the present invention comprises a hydrogenated castor oil having a melting point of 40° C. or more, it particularly becomes excellent in holding strength. In one embodiment of the present invention, it is preferred that the hot melt pressure-sensitive adhesive comprises a hydrogenated castor oil having a melting point of 50 to 100° C. as the component (C1).

In the present invention, a commercially available product may be used as the fatty acid or the derivative thereof (C).

Examples of the commercially available products of the fatty acid derivative (C1) include Hydrogenated palm oil A (trade name), Technol MH (trade name), Technol ML98 (trade name), 12-hydroxystearic acid (trade name), Hydrogenated soybean oil (trade name), Hydrogenated rapeseed oil (trade name), Hydrogenated palm oil (trade name), and rice wax SS-1 (trade name).

Examples of the commercially available fatty acid derivatives other than the component (C1) may include:

FS oil (trade name) and prime taste (trade name) manufactured by Showa Sangyo Co., Ltd.;

Rice oil (trade name) and rice salad oil (trade name) manufactured by Boso oil and fat Co., Ltd.;

Cottonseed oil (trade name) manufactured by Okamura oil and fat Co., Ltd.;

Rikemal (trade name) manufactured by Riken Vitamin Co., Ltd.;

Nonion (trade name) manufactured by NOF Corporation; and the like.

These commercially available fatty acid derivatives may be used alone or in combination.

The hot melt pressure-sensitive adhesive of the present invention may comprise a wax in addition to the components (A) to (C).

The "wax" is an organic substance which is solid at a normal temperature and forms liquid when heated, is generally used for hot melt pressure-sensitive adhesives, and is not particularly limited as long as the hot melt pressure-sensitive adhesive targeted by the present invention can be obtained. The wax generally has a weight-average molecular weight less than 10,000. Specific examples of the wax may include a synthetic wax such as a Fischer-Tropsch wax, a polyolefin wax (e.g. polyethylene wax and polypropylene wax); a petroleum wax such as a paraffin wax and a microcrystalline wax; and a natural wax such as castor wax.

When the hot melt pressure-sensitive adhesive of the present invention comprises a wax, the adhesive residue on the container of the hot melt pressure-sensitive adhesive is reduced when the label is peeled from the container.

In the present invention, the wax preferably comprises Fischer-Tropsch wax. The Fischer-Tropsch wax is a wax fractionated from a wax including component molecules with a relatively wide distribution of the number of carbon atoms so as to include component molecules with a narrow distribution of the number of carbon atoms. Fischer-Tropsch wax reduces the adhesive residue of the hot melt pressure-sensitive adhesive when the label is peeled from the container.

The hot melt pressure-sensitive adhesive of the present invention may comprise a plasticizer.

The plasticizer is blended for the purposes of reducing the melt viscosity of the hot melt pressure-sensitive adhesive, providing flexibility to the hot melt pressure-sensitive adhesive, and improving wetting property of the hot melt pressure-sensitive adhesive on an adherend. The plasticizer is not particularly limited as long as it is compatible with other components and the hot melt pressure-sensitive adhesive targeted by the present invention can be obtained. Examples of the plasticizer include paraffin-based oils, naphthene-based oils and aromatic oils. Particularly, paraffin-based oils and/or naphthene-based oils are preferred, and colorless and odorless paraffin-based oils are most preferred.

Examples of commercial products of plasticizers include White Oil Broom 350 (trade name) manufactured by Kukdong Oil & Chem, Diana Fresia S-32 (trade name), Diana Process Oil PW-90 (trade name) and Daphne Oil KP-68 (trade name) manufactured by Idemitsu Kosan Co., Ltd., Enerper M1930 (trade name) manufactured by BP Chemicals, Kaydol (trade name) manufactured by Crompton, Primol352 (trade name) manufactured by Exxon Mobil Corporation, NS-100 (trade name) manufactured by Idemitsu Kosan Co., Ltd., and DN4010 manufactured by PetroChina. These may be used alone or in combinations of two or more.

Blending the plasticizer improves the compatibility of the components (A) to (C) contained in the hot melt pressure-sensitive adhesive of the present invention and further improve the compatibility with other components, and as a result, tackiness, adhesiveness, and coating suitability of the hot melt pressure-sensitive adhesive is improved.

The hot melt pressure-sensitive adhesive according to the present invention may further comprise various additives as required. Examples of such various additives include a stabilizer and a fine particle filler.

The "stabilizer" is blended to prevent reduction of molecular weight by heating, gelation, coloration, generation of an odor and the like in the hot melt pressure-sensitive adhesive to improve the stability of the hot melt pressure-sensitive adhesive. The "stabilizer" is not particularly limited as long as the hot melt pressure-sensitive adhesive targeted by the present invention can be obtained. Examples of the "stabilizer" include an antioxidant and an ultraviolet absorbing agent.

Examples of the "antioxidant" include phenol-based antioxidants, sulfur-based antioxidants and phosphorus-based antioxidants. Examples of the "ultraviolet absorbing agent" include benzotriazole-based ultraviolet absorbing agents and benzophenone-based ultraviolet absorbing agents. Further, a lactone-based stabilizer may also be added. These may be used alone or in combination. As commercial products of antioxidants, the following products may be used.

Specific examples thereof include SUMILIZER GM (trade name), SUMILIZER TPD (trade name) and SUMILIZER TPS (trade name) manufactured by Sumitomo Chemical Co., Ltd., IRGANOX 1010 (trade name), IRGANOX HP2225FF (trade name), IRGAFOS 168 (trade name), IRGANOX 1520 (trade name) and TINUVIN P manufactured by Ciba Specialty Chemicals, JF77 (trade name) manufactured by Johoku Chemical Co., Ltd., TOM INOX TT (trade name) manufactured by API Corporation, and AO-4125 (trade name) manufactured by ADEKA CORPORATION. These stabilizers may be used alone or in combination.

The "ultraviolet absorbing agent" is used to improve the light resistance of the hot melt pressure-sensitive adhesive. The "antioxidant" is used to prevent the oxidative degradation of the hot melt pressure-sensitive adhesive.

The hot melt pressure-sensitive adhesive of the present invention may further comprise a fine particle filler. The fine particle filler may be a generally used one, and is not particularly limited as long as the hot melt pressure-sensitive adhesive targeted by the present invention can be obtained. Examples of the "fine particle filler" include mica, calcium carbonate, kaolin, talc, titanium oxide, diatomaceous earth, urea-based resins, styrene beads, fired clay and starch. The shape of these is preferably a spherical shape, and their sizes (diameter in the case of a spherical shape) are not particularly limited.

The hot melt pressure-sensitive adhesive according to the present invention may be produced by blending component (A), component (B) and component (C), and preferably wax and a plasticizer and as required, further various additives, using a generally known method for producing a hot melt pressure-sensitive adhesive. The hot melt pressure-sensitive adhesive according to the present invention may be produced by blending predetermined amounts of the above-described components, and heating and melting them. The order of adding the components, the heating method and the like are not particularly limited as long as the targeted hot melt pressure-sensitive adhesive is obtained.

In the hot melt pressure-sensitive adhesive of the present invention, the blending amount of the component (A) is not particularly limited, but is preferably 10 to 50 parts by mass, more preferably 15 to 40 parts by mass, based on 100 parts by mass of the total mass of the component (A), the component (B) and the component (C). When the blending amount of the component (A) is within the above range, the hot melt pressure-sensitive adhesive of the present invention has an increased cohesive force (holding strength) and thereby the label can be easily attached to the container without being displaced.

In the hot melt pressure-sensitive adhesive of the present invention, the blending amount of the component (B) is not particularly limited, but is preferably 40 to 80 parts by mass, more preferably 50 to 75 parts by mass, based on 100 parts by mass of the total mass of the component (A), the component (B) and the component (C). When the blending amount of the component (B) is within the above range, the hot melt pressure-sensitive adhesive of the present invention becomes stable as a pressure-sensitive adhesive and is excellent in balance of alkali-dispersibility, holding strength, reduction of adhesive residue and reduction of stringing.

The blending amount of the α-methylstyrene-based resin based on 100 parts by mass of the total mass of the component (A), the component (B) and the component (C) is preferably 1 to 20 parts by mass, particularly preferably 2 to 10 parts by mass, and most preferably 2.5 to 7.5 parts by mass, in consideration of the comprehensive performance balance of the hot melt pressure-sensitive adhesive.

In the hot melt pressure-sensitive adhesive of the present invention, the blending amount of the component (C) is not particularly limited, but is preferably 3 to 40 parts by mass, more preferably 5 to 35 parts by mass, based on 100 parts by mass of the total mass of the component (A), the component (B) and the component (C). When the blending amount of the component (C) is within the above range, the hot melt pressure-sensitive adhesive of the present invention is improved in alkali-dispersibility and maintains the holding strength, and furthermore, adhesive residue on the adherend can be reduced when the label is peeled.

In the hot melt pressure-sensitive adhesive of the present invention, the total content of the component (A), the component (B) and the component (C) based on the total mass of the hot melt pressure-sensitive adhesive is not particularly limited, but is preferably 50 parts by mass or more, more preferably 60 parts by mass or more, and preferably 90 parts by mass or less, and more preferably 85 parts by mass or less.

In the hot melt pressure-sensitive adhesive of the present invention, the blending amount of the wax based on 100 parts by mass of the total mass of the component (A), the component (B) and the component (C) is not particularly limited, and may be 0 parts by mass, but it is preferably 1 to 30 parts by mass, and more preferably 3 to 25 parts by mass. In one embodiment of the present invention, the hot melt pressure-sensitive adhesive preferably comprises Fischer-Tropsch wax, and the blending amount of Fischer-Tropsch wax based on the total amount of the wax is not particularly limited, but is preferably 20% by mass or more, more preferably 50% by mass or more, and may be 100% by mass.

As one preferred embodiment of the present invention, the hot melt pressure-sensitive adhesive has a viscosity (or melt viscosity) at 160° C. of preferably 4000 mPa·s or less, more preferably 3000 mPa·s or less, and particularly preferably 2000 mPa·s or less. With the viscosity at 160° C. in the above range, the hot melt pressure-sensitive adhesive is much more suitable for coating. The viscosity (or melt viscosity) at 160° C. herein means a value measured by a Brookfield viscometer using a No. 27 rotor.

The label according to the present invention is coated with the hot melt pressure-sensitive adhesive. Specific examples of the label on which the hot melt pressure-sensitive adhesive is applied include labels made of papers such as a paper, a processed paper (paper that has been subjected to aluminum vapor deposition process, aluminum laminating processing, varnish processing, resin processing, or the like), a synthetic paper and the like, and made of an organic compound film, an inorganic compound film, a metal film and the like.

As the label used in the present invention, a film made of an organic compound which is commonly used for alkaline washing, such as polypropylene, polyethylene terephthalate (PET), polylactic acid (PLA) or the like, is particularly preferable. As the polypropylene film, a biaxially oriented polypropylene (OPP) film is particularly preferable.

The hot melt pressure-sensitive adhesive of the present invention may be applied to the entire back surface of the label or a part of the back surface of the label. Examples of the coating method include an open wheel method, a closed gun method, and a direct coating method. The open wheel method and the direct coating method are preferred as a method in which the adhesive does not remain on the PET bottle when the label is peeled off.

The container according to the present invention is the container to which the above label is attached. Specifically, examples thereof include a glass container such as a glass bottle used for a soft drink, a seasoning, a detergent, a shampoo, a cooking oil, a cosmetic, a pharmaceutical, and the like; a plastic container such as a PET (polyethylene terephthalate) bottle; and a metal can such as an aluminum can. Among the above-mentioned containers, a PET bottle is particularly preferable in the present invention. In one embodiment of the present invention, examples of a PET bottle having the label of the present invention attached thereto include a PET bottle with the label attached to a part of the body, and a PET bottle with a "wrap-around label" that is wrapped around the body of the bottle so as to cover the circumference of the bottle. Since the hot melt pressure-sensitive adhesive of the present invention is excellent in holding strength, it is possible to prevent the label from being displaced or lifted even if the container such as a PET bottle expands due to, for example, a carbonated beverage being filled in the container.

The hot melt pressure-sensitive adhesive of the present invention is preferably used for adhering the wrap-around label. As the wrap-around label, biaxially oriented polypropylene (OPP) film is frequently used. The label on which the hot melt pressure-sensitive adhesive of the present invention is applied may be printed or may not be printed. When a printed label is used, the hot melt pressure-sensitive adhesive of the present invention may be applied not only on the non-printed surface but also on the printed surface.

As one device for attaching a label to a PET bottle using the hot melt pressure-sensitive adhesive of the present invention, an open wheel type device may be exemplified. The hot melt pressure-sensitive adhesive is melted at 120 to 190° C. and applied on the back surface of the label by the open wheel type device. This label is attached to the PET bottle to manufacture the container of the present invention.

The container to which the label is attached by the hot melt pressure-sensitive adhesive of the present invention is suitable for reuse or the like of the container because the label is easily peeled from the container when it is immersed in a hot alkaline solution. The method of peeling the label with a hot alkaline solution is not particularly limited, but examples thereof include the method in which the container to which the label is attached is cut into small pieces into pellets, the pellets are put into the hot alkaline aqueous solution (for example, an aqueous solution of sodium hydroxide having a concentration of 0.5 to 5.0% by mass with a temperature of 80° C. to 90° C.) and stirring is performed for about 1 minute to 2 hours.

The container to which the label is attached with the hot melt pressure-sensitive adhesive of the present invention has sufficient adhesiveness so that the label does not peel off from under normal use of the container. Further, when the label is peeled off after using the container, it can be peeled off by hand without adhesive residue and is excellent in releasability.

Example

For the purpose of describing the present invention in more details and more specifically, the present invention will be described below using Examples. These Examples do not limit the present invention. In the Examples and Comparative Examples, the components to be blended in the hot melt pressure-sensitive adhesive are shown below.

(A) Thermoplastic Block Copolymer
  (A1) Styrene-based block copolymer having a styrene content of less than 40% by mass
  (A1-1) Styrene-ethylene/butylene-styrene triblock copolymer (Kraton G-1652 (trade name) manufactured by Kraton Corporation, styrene content: 30% by mass, diblock content: 0% by mass, weight average molecular weight: 72,000)
  (A1-2) Styrene-ethylene/butylene-styrene triblock copolymer (Kraton G-1650 (trade name) manufactured by Kraton Corporation, styrene content: 30% by mass, diblock content: 0% by mass, weight average molecular weight: 92,000)
  (A1-3) Styrene-ethylene/butylene-styrene block copolymer (Kraton G-1726 (trade name) manufactured by Kraton Corporation, styrene content: 31% by mass, diblock content: 73% by mass, weight average molecular weight: 43,000)
  (A1-4) Styrene-ethylene/butylene-styrene block copolymer (Kraton G-1657 (trade name) manufactured by Kraton Corporation, styrene content: 15% by mass, diblock content: 33% by mass, weight average molecular weight: 106,000)
  (A2) Styrene-based block copolymer having a styrene content of 40% by mass or more
  (A2-1) Styrene-ethylene/butylene-styrene triblock copolymer (Tuftec H1043 (trade name) manufactured by Asahi Kasei Chemicals Corporation, styrene content: 68% by mass, diblock content: 0% by mass, weight average molecular weight: 53,000)
  (A2-2) Styrene-butadiene/butylene-styrene triblock copolymer (Tuftec P2000 (trade name) manufactured by Asahi Kasei Chemicals Corporation, styrene content: 68% by mass, diblock content: 0% by mass, weight average molecular weight: 54,000)
  (A2-3) Styrene-butadiene-styrene triblock copolymer (TR2250 (trade name) manufactured by JSR Corporation, styrene content: 52% by mass, diblock content: 0% by mass, weight average molecular weight: 109,000)
  (A2-4) Styrene-butadiene-styrene triblock copolymer (Tufprene A (trade name) manufactured by Asahi Kasei Chemicals Corporation, styrene content: 41% by mass, diblock content: 0% by mass, weight average molecular weight: 105,000)
  (A2-5) Styrene-butadiene-styrene block copolymer (Asaprene T-439 (trade name) manufactured by Asahi Kasei Chemicals Corporation, styrene content: 46% by mass, diblock content: 69% by mass, weight average molecular weight: 63,000)
  (A2-6) Styrene-isoprene-styrene triblock copolymer (Kraton D-1162 (trade name) manufactured by Kraton Corporation, styrene content: 41% by mass, diblock content: 0% by mass, weight average molecular weight: 82,000)

(B) Tackifier Resin
- (B1) Hydrogenated alicyclic/aromatic copolymer-based hydrocarbon resin (T-REZ HC103 (trade name) manufactured by JXTG Energy Corporation, softening point: 103° C.)
- (B2) Hydrogenated alicyclic-based hydrocarbon resin (T-REZ HA103 (trade name) manufactured by JXTG Energy Corporation, softening point: 103° C.)
- (B3) Hydrogenated alicyclic-based hydrocarbon resin (T-REZ HA125 (trade name) manufactured by JXTG Energy Corporation, softening point: 125° C.)
- (B4) Hydrogenated rosin ester (KOMOTAC KHR75 (trade name) manufactured by GUANGDONG KOMO Co., Ltd., acid value: 170 mgKOH/g, softening point: 80° C.)
- (B5) Hydrogenated rosin ester (ForalAX-E (trade name) manufactured by Eastman Chemical Company, acid value: 160 mgKOH/g, softening point: 80° C.)
- (B6) Rosin ester (KOMOTAC K107 (trade name) manufactured by GUANGDONG KOMO Co., Ltd., acid value: 155 mgKOH/g, softening point: 80° C.)
- (B7) α-methylstyrene-based resin (Kristalex 3070 (trade name) manufactured by Eastman Chemical Company, softening point: 70° C.)
- (B8) α-methylstyrene-based resin (Kristalex 3085 (trade name) manufactured by Eastman Chemical Company, softening point: 85° C.)
- (B9) α-methylstyrene-based resin (Kristalex 3100 (trade name) manufactured by Eastman Chemical Company, softening point: 100° C.)
- (B10) α-methylstyrene-based resin (Kristalex 5140 (trade name) manufactured by Eastman Chemical Company, softening point: 140° C.)
- (B11) Hydrogenated rosin ester (Foral 85E (trade name) manufactured by Eastman Chemical Company, acid value: 9 mgKOH/g, softening point: 85° C.)
- (B12) Rosin ester (KOMOTAC KB90H (trade name) manufactured by GUANGDONG KOMO Co., Ltd., acid value: 15 mgKOH/g, softening point: 90° C.)

(C) At Least One Selected from the Group Consisting of a Fatty Acid and Derivatives Thereof:
- (C1) Fatty acid derivative having a melting point of 40° C. or more
- (C1-1) Hardened castor oil (hardened castor oil A (trade name) manufactured by Ito Oil Co., Ltd., melting point: 85.5° C.)
- (C1-2) Monohydroxystearic acid-hardened castor oil (Technol MH (trade name) manufactured by Yokozeki Oil & Fat Industries Co., Ltd., melting point: 58.0° C.)
- (C1-3) Hydrogenated castor oil laurate (Technol ML98 (trade name) manufactured by Yokozeki Oil & Fat Industries Co., Ltd., melting point: 51.0° C.)
- (C1-4) Castor hardened fatty acid (12-hydroxystearic acid (trade name) manufactured by NOF CORPORATION, melting point: 69.0° C.)
- (C1-5) Hydrogenated beef tallow oil (beef tallow 51° hydrogenated oil HO (trade name) manufactured by NOF CORPORATION, melting point: 51.0° C.)
- (C1-6) Extremely hardened soybean oil (hydrogenated soybean oil (trade name) manufactured by Yamakei Sangyo Co., Ltd., melting point: 68.2° C.)
- (C1-7) Extremely hardened rapeseed oil (hydrogenated rapeseed oil (trade name) manufactured by Yamakei Sangyo Co., Ltd., melting point: 68.4° C.)
- (C1-8) Extremely hardened palm oil (hydrogenated palm oil (trade name) manufactured by Yamakei Sangyo Co., Ltd., melting point: 58.6° C.)
- (C1-9) Rice wax extremely hardened rapeseed oil (Rice wax SS-1 (trade name) manufactured by Boso Oil & Fat Co., Ltd., melting point: 79.0° C.)
- (C2) Fatty acid derivative having a melting point of less than 40° C.
- (C2-1) Castor oil (Industrial No. 1 castor oil (trade name) manufactured by Hokoku Corporation, melting point: not observed (freezing point: −22° C.))
- (C2-2) Rice oil (rice salad oil (trade name) manufactured by Boso Oil & Fat Co., Ltd., melting point: not observed (freezing point: −10 to −5° C.))
- (C2-3) Sunflower oil (High oleic sunflower oil manufactured by Yamakei Sangyo Co., Ltd. (trade name), melting point: no (freezing point: −18 to −16° C.))
- (C2-4) Coconut oil (coconut oil manufactured by Yamakei Sangyo Co., Ltd. (trade name), melting point: 24.6° C.)
- (C2-5) Diglycerin fatty acid ester (Rikemal L-71-D (trade name) manufactured by RIKEN Vitamin Co., Ltd., melting point: 34° C.)

(D) Wax
- (D1) Fischer-Tropsch wax (Sasol C80 (trade name) manufactured by Sasol Limited, melting point: 80° C., penetration degree: 7)
- (D2) Fischer-Tropsch wax (Sasol H1 (trade name) manufactured by Sasol Limited, melting point: 108° C., penetration degree: 2)
- (D3) Ethylene-vinyl acetate copolymer wax (AC400 (trade name) manufactured by Honeywell, melting point: 92° C.)
- (D4) Polyethylene wax (High wax 320P (trade name) manufactured by Mitsui Chemicals, Inc., melting point: 109° C., penetration degree: 7)
- (D5) Polypropylene wax (High wax NP105 (trade name) manufactured by Mitsui Chemicals, Inc., melting point 140/148° C., penetration degree: 1)
- (D6) Paraffin wax (HNP-9 (trade name) manufactured by Nippon Seiro Co., Ltd., melting point: 75° C., penetration degree: 6)

(E) Plasticizer (Oil)
- (E1) Paraffin oil (Daphne oil KP-68 (trade name) manufactured by Idemitsu Kosan Co., Ltd.)
- (E2) Paraffin oil (Diana process oil PW90 (trade name) manufactured by Idemitsu Kosan Co., Ltd.)
- (E3) Polybutene (Nisseki Polybutene HV-300 (trade name) manufactured Nippon Oil Corporation)
- (E4) Naphthenic oil (DN4010 (trade name) manufactured by PetroChina Co. Ltd.)

(F) Stabilizer (Antioxidant)
- (F1) Hindered phenol-based antioxidant (ADK STAB AO-60 (trade name) manufactured by Adeka Corporation)
- (F2) Thioether-based antioxidant (ADK STAB AO-4125 (trade name) manufactured by Adeka Corporation)

The components (A) to (F) are blended in the blending ratios shown in Tables 1 and 2, and melt and mixed at about 145° C. for about 3 hours using a universal stirrer to prepare hot melt pressure-sensitive adhesives of Examples 1 to 18 and Comparative Examples 1 to 4. The numerical values regarding the composition (blend) of the hot melt pressure-sensitive adhesives shown in Tables 1 and 2 are all in part(s) by weight.

Alkali-dispersibility, holding property, adhesive residue, and stringing property were evaluated for each of the hot melt pressure-sensitive adhesives of Examples and Comparative Examples. Each measurement method and evaluation method will be described below.

<Alkali-Dispersibility>

The hot melt pressure-sensitive adhesive of each Example and Comparative Example was applied on the OPP film so as to have a thickness of 20 to 25 μm to prepare a label (25 mm×50 mm) of the OPP film with the hot melt pressure-sensitive adhesive. This label was attached to an empty PET bottle by pressing at 100° C. for 5 seconds to prepare a test sample.

After measuring the mass of this test sample (mass of the test sample before washing), it was placed in a 1.5 mass % sodium hydroxide aqueous solution at 85° C. and stirred (washed) for 15 minutes. After 15 minutes, the test sample was taken out and air-dried sufficiently. The mass of the test sample after the air-drying (mass of the test sample after washing) was measured, and the alkali-dispersion ratio was calculated from the mass before and after washing. The alkali-dispersion ratio was calculated from the following formula, and the alkali-dispersibility was evaluated from the calculated value.

Alkali-dispersion ratio (%)={(mass of the test sample before washing−mass of the test sample after washing)/(mass of the hot melt pressure-sensitive adhesive used)}×100

The evaluation results are shown in Table 3. The evaluation criteria are as follows.

○○: Alkali dispersion ratio was more than 90%.
○: Alkali dispersion ratio was 60% or more and 90% or less.
x: Alkali dispersion ratio was less than 60%, or measurement is impossible because the film did not adhere and a test sample could not be prepared.

<Holding Property (Label-Lifting and Label-Displacement)>

A hot melt pressure-sensitive adhesive was applied on an OPP film so as to have a thickness of 20 to 25 μm to prepare the OPP label (25 mm×50 mm) with the hot melt pressure-sensitive adhesive. The label was attached to an empty PET bottle by pressing at 100° C. for 5 seconds to prepare a test sample.

Next, the PET bottle was filled with a carbonated beverage, and the test sample containing the carbonated beverage was stored in an atmosphere of 50° C. for one week. Another test sample containing a carbonated beverage was stored in an atmosphere of −10° C. for one day. An existence of label-lifting and a label-displacement distance of each test sample were observed.

The evaluation results are shown in Table 3. The evaluation criteria are as follows.

○○: No label-lifting was observed and the label-displacement distance was less than 2 mm.
○: No label-lifting was observed and the label-displacement distance was 2 mm or more and less than 4 mm.
Δ: No label-lifting was observed and the label-displacement distance was 4 mm or more and less than 7 mm.
x: Label-lifting was observed, or the label-displacement distance was 7 mm or more.

<Adhesive Residue>

The hot melt pressure-sensitive adhesive was applied on an OPP film so as to have a thickness of 20 to 25 μm to prepare the OPP label (25 mm×50 mm) with the hot melt pressure-sensitive adhesive. The label was attached to an empty PET bottle by pressing at 100° C. for 5 seconds to prepare a test sample. After storing the test sample in an atmosphere of 23° C. and 55% humidity for 3 days, the label was peeled from the PET bottle by hand, and the adhesion state of the hot melt pressure-sensitive adhesive to the PET bottle was visually observed.

The evaluation results are shown in Table 3. The evaluation criteria are as follows.

○○: Interfacial failure (peeling at an interface) was observed and no hot melt pressure-sensitive adhesive was remained.
○: The hot melt pressure-sensitive adhesive was slightly remained.
x: Cohesive failure was observed, and most of the hot melt pressure-sensitive adhesive remained on the PET bottle.

<Evaluation of Stringing Properties>

The hot melt pressure-sensitive adhesive was intermittently applied to an adherend disposed 20 cm away in vertical direction from the tip of a hot melt gun. The state of a falling object between the hot melt gun and the adherend was visually observed for evaluation of stringing properties. The measurement conditions were as follows:

Temperature setting: 160° C. for all of tank, hose, and nozzle
Nozzle diameter: 14/1000 inch
Nozzle: single nozzle
Application pressure: 0.3 MPa
Application shot number: 90 shots/30 seconds The evaluation results are shown in Table 3. The evaluation criteria are as follows:

○: Falling objects fell away from the nozzle (no stringing).
x: Falling objects adhered around the nozzle (with stringing).

TABLE 1

|  | Examples | | | | | | | | | | |
| --- | --- | --- | --- | --- | --- | --- | --- | --- | --- | --- | --- |
|  | 1 | 2 | 3 | 4 | 5 | 6 | 7 | 8 | 9 | 10 | 11 |
| A1-1 | 15.2 |  | 16.2 | 13.3 |  |  |  |  |  | 15.1 | 14.6 |
| A1-2 | 5.6 | 13.3 |  |  | 16.4 | 17.2 | 16.9 | 16.7 | 16.7 | 5.5 | 5.6 |
| A1-3 |  | 6.7 |  |  |  |  |  |  |  |  |  |
| A1-4 |  |  |  | 4.2 |  |  |  |  |  |  |  |
| A2-1 |  |  |  |  | 6.7 |  |  |  |  |  |  |
| A2-2 |  |  |  |  |  | 4.1 |  |  |  |  |  |
| A2-3 |  |  |  |  |  |  | 2.9 |  |  |  |  |
| A2-4 |  |  |  |  |  |  |  | 4.2 |  |  |  |
| A2-5 |  |  |  |  |  |  |  |  | 4.2 |  |  |
| A2-6 |  |  |  |  |  |  |  |  |  | 4.2 |  |
| B1 | 16.7 | 16.0 | 16.2 | 13.3 | 20.6 | 21.5 | 14.1 | 20.9 | 20.9 | 16.4 | 16.0 |
| B2 | 20.9 | 20.0 | 20.3 | 13.3 | 13.7 | 14.3 | 21.2 |  |  | 20.6 | 20.0 |
| B3 |  |  |  |  |  |  |  | 13.9 | 13.9 |  |  |
| B4 | 27.8 | 33.3 | 27.0 | 40.0 | 27.4 | 21.5 | 21.2 | 20.9 | 20.9 | 27.4 | 13.3 |

TABLE 1-continued

| | Examples | | | | | | | | | | |
|---|---|---|---|---|---|---|---|---|---|---|---|
| | 1 | 2 | 3 | 4 | 5 | 6 | 7 | 8 | 9 | 10 | 11 |
| B5 | | | | | | | | | | | |
| B6 | | | | | | | | | | | |
| B7 | | | | 4.0 | | 4.1 | | | | | |
| B8 | 4.1 | 4.1 | 6.8 | | | | | 2.7 | 2.7 | 4.1 | 4.0 |
| B9 | | | | | 4.1 | | 4.1 | | | | |
| B10 | | | | | | | | 1.4 | 1.4 | | |
| B11 | | | | | | | | | | | |
| B12 | | | | | | | | | | | |
| C1-1 | 9.7 | | 5.4 | 5.5 | 9.6 | 14.3 | 14.1 | 16.7 | 16.7 | 8.2 | 26.6 |
| C1-2 | | 6.8 | | | | | | | | | |
| C1-3 | | | 4.1 | | | | | | | | |
| C1-4 | | | | 4.0 | | | | | | | |
| C1-5 | | | | | 4.1 | | | | | | |
| C1-6 | | | | | | 4.3 | | | | | |
| C1-7 | | | | | | | 4.2 | | | | |
| C1-8 | | | | | | | | 2.8 | | | |
| C1-9 | | | | | | | | | 2.8 | 2.7 | |
| C2-1 | | | | | | | | | | | |
| C2-2 | | | | | | | | | | | |
| C2-3 | | | | | | | | | | | |
| C2-4 | | | | | | | | | | | |
| C2-5 | | | | | | | | | | | |
| Total of A to C | 100.0 | 100.0 | 100.0 | 100.0 | 100.0 | 100.0 | 100.0 | 100.0 | 100.0 | 100.0 | 100.0 |
| D1 | 8.3 | 5.3 | | 8.0 | | 7.2 | | | 13.9 | 6.9 | |
| D2 | | 2.7 | 5.4 | | 6.9 | | 7.1 | 5.6 | | 2.7 | 10.6 |
| D3 | | | 4.1 | | | | | | | | |
| D4 | | | | | | | | 2.8 | | | |
| D5 | | | | | | | | | 1.4 | | |
| D6 | | | | | 2.7 | | | | | | |
| E1 | 16.7 | 14.6 | 9.5 | 10.6 | 17.8 | | 14.3 | 16.9 | 11.1 | | 16.0 |
| E2 | | | | | | 7.2 | | | | 13.7 | |
| E3 | | | | | | | | | | 13.7 | 6.7 |
| E4 | 13.9 | 10.6 | 16.2 | 14.6 | 9.6 | 14.3 | 14.1 | 20.9 | 8.3 | | |
| F1 | 0.4 | 0.4 | 0.4 | 0.4 | 0.4 | 0.4 | 0.4 | 0.4 | 0.4 | 0.4 | 0.4 |
| F2 | 0.3 | 0.3 | 0.3 | 0.3 | 0.3 | 0.3 | 0.3 | 0.3 | 0.3 | 0.3 | 0.3 |
| Total of A to F | 139.6 | 133.9 | 135.8 | 133.9 | 137.7 | 143.6 | 141.6 | 139.6 | 139.6 | 137.7 | 133.9 |

TABLE 2

| | Examples | | | | | | | Comparative Examples | | | |
|---|---|---|---|---|---|---|---|---|---|---|---|
| | 12 | 13 | 14 | 15 | 16 | 17 | 18 | 1 | 2 | 3 | 4 |
| A1-1 | 27.4 | 32.0 | | 16.0 | 16.0 | | | | 15.2 | | |
| A1-2 | | | 19.1 | 4.0 | 4.0 | 20.0 | 15.0 | | 6.7 | | 36.3 |
| A1-3 | | | | | | | | | | | |
| A1-4 | | | | | | | | | | | |
| A2-1 | | | | | | | | | | 21.9 | |
| A2-2 | | | | | | | | 15.2 | | | |
| A2-3 | | | | | | | | 6.7 | | | |
| A2-4 | | | | | | | | | | | |
| A2-5 | | | | | | | | | | | |
| A2-6 | | | | | | | | | | | |
| B1 | 16.4 | 15.4 | 17.6 | 16.0 | 16.0 | 18.3 | 15.0 | 16.0 | 16.0 | 16.0 | |
| B2 | 20.6 | 19.2 | 22.1 | 20.0 | 20.0 | | 15.0 | 20.0 | 20.0 | 20.0 | |
| B3 | | | | | | 20.0 | | | | | |
| B4 | 20.6 | 19.2 | 22.1 | 20.0 | 26.6 | 26.6 | 26.4 | 28.3 | 32.4 | 28.3 | |
| B5 | | | | | | | | | | | |
| B6 | | | | | | | | | | | |
| B7 | | | | | | | | | | | |
| B8 | | | | 4.0 | 2.7 | 1.5 | 15.0 | 4.1 | | 4.1 | |
| B9 | 5.5 | 5.1 | 5.9 | | | | | | | | |
| B10 | | | | | | | | | | | |
| B11 | | | | 6.7 | | | | | | | |
| B12 | | | | | 4.0 | | | | | | |
| C1-1 | 6.9 | 6.4 | 7.4 | 13.6 | 10.9 | 13.6 | 13.6 | 9.7 | 9.7 | 9.7 | |
| C1-2 | | | | | | | | | | | 63.7 |
| C1-3 | | | | | | | | | | | |
| C1-4 | | | | | | | | | | | |
| C1-5 | | | | | | | | | | | |
| C1-6 | | | | | | | | | | | |

TABLE 2-continued

|  | Examples | | | | | | | Comparative Examples | | | |
|---|---|---|---|---|---|---|---|---|---|---|---|
|  | 12 | 13 | 14 | 15 | 16 | 17 | 18 | 1 | 2 | 3 | 4 |
| C1-7 | | | | | | | | | | | |
| C1-8 | | | | | | | | | | | |
| C1-9 | | | | | | | | | | | |
| C2-1 | 2.7 | | | | | | | | | | |
| C2-2 | | 2.7 | | | | | | | | | |
| C2-3 | | | 2.9 | | | | | | | | |
| C2-4 | | | | | | | | | | | |
| C2-5 | | | 2.9 | | | | | | | | |
| Total of A to C | 100.0 | 100.0 | 100.0 | 100.0 | 100.0 | 100.0 | 100.0 | 100.0 | 100.0 | 100.0 | 100.0 |
| D1 | 6.9 | | 17.6 | | | | | 8.3 | 8.3 | 8.3 | |
| D2 | | 7.7 | | 6.7 | 6.7 | 6.7 | 6.7 | | | | 18.2 |
| D3 | | | | | | | | | | | |
| D4 | 2.7 | | | | | | | | | | |
| D5 | | | | | | | | | | | |
| D6 | | | | | | | | | | | |
| E1 | | 12.8 | | 13.3 | 13.3 | 13.3 | 13.3 | 16.7 | 16.7 | 16.7 | |
| E2 | 13.7 | | 14.7 | | | | | | | | 27.3 |
| E3 | | | | | | | | | | | |
| E4 | 20.6 | 7.7 | 14.7 | 13.3 | 13.3 | 13.3 | 13.3 | 13.9 | 13.9 | 13.9 | 36.4 |
| F1 | 0.4 | 0.4 | 0.4 | 0.4 | 0.4 | 0.4 | 0.4 | 0.4 | 0.4 | 0.4 | 0.5 |
| F2 | 0.3 | 0.3 | 0.3 | 0.3 | 0.3 | 0.3 | 0.4 | 0.3 | 0.3 | 0.3 | 0.4 |
| Total of A to F | 144.5 | 128.8 | 147.7 | 133.9 | 133.9 | 134.0 | 134.1 | 139.6 | 139.5 | 139.6 | 182.8 |

TABLE 3

|  |  | Examples | | | | | | | | | | | | | | | | | | Comparative Examples | | | |
|---|---|---|---|---|---|---|---|---|---|---|---|---|---|---|---|---|---|---|---|---|---|---|---|
|  |  | 1 | 2 | 3 | 4 | 5 | 6 | 7 | 8 | 9 | 10 | 11 | 12 | 13 | 14 | 15 | 16 | 17 | 18 | 1 | 2 | 3 | 4 |
| alkali-dispersibility | Stir in 1.5% NaOH aqueous solution at 85° C. for 15 minutes | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | x |
| Label-lifting and Label-displacement | 50° C. × 1 week | ⊚ | ⊚ | ⊚ | ⊚ | ⊚ | ⊚ | ○ | ○ | ○ | ○ | ○ | ○ | ○ | ○ | ⊚ | ⊚ | ○ | ○ | x | x | ○ | x |
|  | −10° C. × 1 day | ⊚ | ⊚ | ⊚ | ⊚ | ⊚ | ⊚ | ○ | ⊚ | ⊚ | ⊚ | ⊚ | ⊚ | ○ | ⊚ | ⊚ | ⊚ | ⊚ | ○ | x | x | x | Δ |
| Adhesive residue on the PET bottle | after 23° C. × 3 days | ⊚ | ⊚ | ⊚ | ⊚ | ⊚ | ⊚ | ○ | ○ | ○ | ○ | ○ | ○ | ○ | ○ | ⊚ | ⊚ | ⊚ | ⊚ | x | ○ | ○ | x |
| stringing property |  | ○ | ○ | ○ | ○ | ○ | ○ | ○ | ○ | ○ | ○ | ○ | ○ | ○ | ○ | ○ | ○ | ○ | ○ | ○ | ○ | ○ | x |

As shown in Table 3, the alkali-dispersible hot melt pressure-sensitive adhesives of Examples were excellent in alkali-dispersibility and holding strength, and capable of reducing an adhesive residue and a stringing. It was confirmed that the hot melt pressure-sensitive adhesives of Examples 1 to 18 maintained the above performances at a high level. On the other hand, for each of the hot melt pressure-sensitive adhesives of Comparative Examples 1 to 4, at least one of the performances was insufficient.

From these results, it was shown that when the hot melt pressure-sensitive adhesive comprises the components (A), (B) and (C), and the component (A) comprises (A1) a styrene-based block copolymer having a styrene content of less than 40 mass % and the component (B) comprises an α-methylstyrene-based resin, the hot melt pressure-sensitive adhesive which (i) has a high alkali-dispersibility, (ii) is excellent in strength to retain a label, (iii) hardly causes an adhesive residue and (iv) is capable of reducing stringing can be obtained.

INDUSTRIAL APPLICABILITY

The present invention can provide an alkali-dispersible hot melt pressure-sensitive adhesive, a label on which the alkali-dispersible hot melt pressure-sensitive adhesive is applied, and a container to which the label is attached.

The invention claimed is:

1. An alkali-dispersible hot melt pressure-sensitive adhesive consisting of:
    (A) a mixture of styrene-ethylene/butylene-styrene triblock copolymers having a styrene content less than 40% by mass;
    (B) a tackifier resin which is a mixture of styrene/α-methylstyrene-based resins
    (C) a first (C1) hydrogenated castor oil having a melting point of 45 to 120° C. and a second (C2) hydrogenated castor oil having a melting point of less than 40° C.;
    (D) a Fischer-Tropsch wax or a mixture of Fischer-Tropsch waxes;
    (E) a plasticizer which is a paraffin-based oil and/or a naphthalene-based oil; and
    (F) at least one additive selected from stabilizer, antioxidant, ultraviolet absorbing agent or particle filler.

2. The alkali-dispersible hot melt pressure-sensitive adhesive according to claim 1, a content of the tackifier resin is 1 to 20 parts by mass based on 100 parts by mass of the total mass of the components (A) to (C).

3. A label comprising the alkali-dispersible hot melt pressure-sensitive adhesive according to claim 1.

4. A container comprising the label according to claim 3.

* * * * *

UNITED STATES PATENT AND TRADEMARK OFFICE
CERTIFICATE OF CORRECTION

PATENT NO. : 12,173,206 B2
APPLICATION NO. : 17/806313
DATED : December 24, 2024
INVENTOR(S) : Ai Takamori Page 1 of 1

It is certified that error appears in the above-identified patent and that said Letters Patent is hereby corrected as shown below:

In the Specification

Column 11, Line 25 change "AO-4125 (trade name)" to --AO-412S (trade name)--.

Column 16, Line 53 change "(ADK STAB AO-4125)" to --(ADK STAB AO-412S)--.

Signed and Sealed this
Thirtieth Day of December, 2025

John A. Squires
*Director of the United States Patent and Trademark Office*